US006214931B1

(12) United States Patent
Segers et al.

(10) Patent No.: US 6,214,931 B1
(45) Date of Patent: Apr. 10, 2001

(54) PRESSURE-SENSITIVE ADHESIVES AND SELF-ADHESIVE FILMS USING SAID ADHESIVES

(75) Inventors: Willy Segers, Jurbise; Jean-Marie Hoebeke, Thimeon; Jean-Marie Loutz, Brussels, all of (BE)

(73) Assignee: UCB, S.A., Brussels (BE)

( * ) Notice: Subject to any disclaimer, the term of this patent is extended or adjusted under 35 U.S.C. 154(b) by 0 days.

(21) Appl. No.: 09/117,215

(22) PCT Filed: Jan. 1, 1997

(86) PCT No.: PCT/BE97/00009

§ 371 Date: Apr. 21, 1999

§ 102(e) Date: Apr. 21, 1999

(87) PCT Pub. No.: WO97/27261

PCT Pub. Date: Jul. 31, 1997

(30) Foreign Application Priority Data

Jan. 25, 1996 (BE) .................................................. 9600071

(51) Int. Cl.[7] .............................. C08F 220/18; C09J 7/02
(52) U.S. Cl. ........................ 525/34; 525/35; 428/355 AC
(58) Field of Search ................. 522/34, 35; 428/355 AC

(56) References Cited

U.S. PATENT DOCUMENTS 3,983,297 * 9/1976 Ono et al. ............................. 428/355
3,998,997 * 12/1976 Mowdood et al. ................... 526/271
4,077,926 * 3/1978 Sanderson et al. ........... 260/29.6 TA

FOREIGN PATENT DOCUMENTS 2-3404 * 1/1990 (JP) .

OTHER PUBLICATIONS

Asmussen et al., "Solubility Parameters, Fractional Polarities, and Bond Strengths of Some Intermediary Resins Used in Dentin Bonding", Journal of Dental Research, vol. 72, No. 3, Mar. 1993, pp. 558–565.*

* cited by examiner

Primary Examiner—Daniel Zirker
(74) Attorney, Agent, or Firm—Wenderoth, Lind & Ponack, L.L.P.

(57) ABSTRACT

Pressure sensitive adhesives comprised of an aqueous dispersion of a copolymer of acrylic esters obtained in the presence of a crosslinking monomer carrying a functional group are set forth, said copolymer having a glass transition temperature which does not exceed 0° C. The crosslinking monomer is methacrylic anhydride. The resulting adhesive displays improved adhesion and cohesion properties.

11 Claims, No Drawings

PRESSURE-SENSITIVE ADHESIVES AND SELF-ADHESIVE FILMS USING SAID ADHESIVES

The present invention relates to pressure-sensitive adhesives, i.e. adhesives whose adhesion to a given substrate is obtained after simple application of light pressure. More particularly, the present invention relates to such pressure-sensitive adhesives, which are in aqueous emulsion form and have improved remanence of the adhesive properties when the said adhesives are applied to various substrates, in particular films of polyvinyl chloride, polyethylene, polypropylene, polyethylene terephthalate, paper, glass, etc. The present invention also relates to self-adhesive films and to other similar articles using the said adhesives.

Pressure-sensitive adhesives intended for plasticized polyvinyl chloride were originally obtained by radical polymerization in organic solvents such as ethyl acetate, toluene or hexane, or alternatively in a combination of several of these solvents. In view of the nature of the parameters governing radical copolymerization in solvents, leading to low molecular masses, these products necessarily had to undergo considerable post-crosslinking in order to have an equilibrium between the various adhesive properties, which are compatible with the requirements inherent to the very nature of plasticized polyvinyl chloride. This means, for example, that the internal cohesion of the product must be sufficient to be able to compensate for the adverse changes in the properties due to the migration of the polyvinyl chloride plasticizers.

For obvious reasons of environmental protection, the pressure-sensitive adhesives obtained as an aqueous emulsion are nowadays preferred to those obtained in solution in an organic solvent. Thus, U.S. Pat. No. 3,983,297 discloses a pressure-sensitive adhesive comprising, as main constituent, a copolymer prepared as an emulsion comprising (1) 94 to 98 mol % of at least one alkyl acrylate, where appropriate as a mixture with methyl methacrylate or vinyl acetate, (2) 2 to 6 mol % of acrylic acid and/or methacrylic acid, and (3) 0.002 to 0.05 mol % of a copolymerizable polyfunctional compound. Similarly, U.S. Pat. No. 3,998,997 describes a pressure-sensitive adhesive obtained by emulsion polymerization of a monomer system comprising (1) 50 to 60 parts by weight of 2-ethylhexyl acrylate, (2) 35 to 45 parts by weight of ethyl acrylate, (3) 1 to 3 parts by weight of acrylic acid, (4) 2 to 5 parts by weight of diacetophenone acrylamide or diacetone acrylamide and, where appropriate, hydroxypropyl (meth)acrylate, and/or maleic anhydride, and/or glycidyl (meth)acrylate and/or a polyfunctional vinylic crosslinking agent.

Japanese patent application published under No. 2-003,404 teaches the emulsion polymerization of a monomer mixture comprising:

(A) from 60 to 99% by weight of a ($C_4$–$C_8$)alkyl acrylate,
(B) from 0.2 to 10% by weight of a functional monomer chose from α,β-unsaturated carboxylic acids and their anhydrides, 2-hydroxyalkyl (meth)acrylates and (methylol) (meth)acrylamides, and
(C) from 0 to 30% of another vinyl monomer, in the presence of a water-soluble compound chosen from dihydrofuran, dihydropyran and methylcyclohexenedicarboxylic and norbornenedicarboxylic acids, in order to obtain a copolymer dispersion having a glass transition temperature of from –10 to –90° C.

In the case of the pressure-sensitive adhesives obtained in solution form, it is possible to obtain an acceptable compromise between the adhesion and the adhesive power (tack), on the one hand, and the cohesion, on the other hand, by crosslinking the product using, for example, metal chelates. This technique offers fairly wide flexibility and allows the properties of the product to be adjusted fairly easily to the desired level.

In the case of the pressure-sensitive adhesives obtained in emulsion form, the problem is considerably more complex since there is greater dispersity in the molar mass distribution; furthermore, the equilibrium of the product is also disrupted by the presence of a series of polymerization auxiliaries such as emulsifiers, which are external to the polymer chains, and which can behave, for example, as plasticizers. It is accepted in particular that the presence of long acrylic chains, which are characteristic of emulsion polymerization, is responsible for the lack of adhesion of these products.

If the length of the acrylic chains is reduced (for example by using a transfer agent during the emulsion polymerization), the adhesion is indeed improved (peel strength), but, in this case, the cohesion is lost (shear strength), since it is generally accepted that long chains are needed in order to obtain acceptable cohesion.

Many means have been mentioned in the literature to bring the cohesion of the pressure-sensitive adhesives obtained in emulsion form to the desired level while at the same time maintaining aggressiveness of contact (as defined below), at least equal to 7 N/25 mm approximately. One of the means most commonly used is the copolymerization of functionalized monomers such as N-methylolacrylamide. This monomer effectively makes it possible to increase the internal cohesion of the product, but at the expense of the other properties. Furthermore, these properties are greatly influenced by the heat treatment to which the copolymer has been subjected.

In addition, the presence in N-methylolacrylamide of certain impurities such as acrylamide or formaldehyde can also produce harmful effects, such as adverse increases in viscosity. Other means for increasing the cohesion, such as the use of functional silanes bearing a double bond (for example propyltrimethoxysilane methacrylate or vinyltriethoxysilane methacrylate), give rise to problems of degradation of the properties over time or alternatively can only be used in the context of a two-component system, which imposes practical constraints on the user that are often unacceptable.

Lastly, aqueous dispersions, used in particular in heat-resistant adhesive compositions or contact adhesives, are known from patent application EP-A-620,234, these dispersions being prepared by emulsion polymerization of a monomer, a homopolymer of which has a glass transition temperature (Tg) of greater than 30° C. and has only one ethylenic unsaturation in the molecule, and of a flexible monomer, a homopolymer of which has a glass transition temperature of less than 10° C. and at most has one ethylenic unsaturation in the molecule, the proportions of the two monomers being such that the glass transition temperature of the copolymer is between 5 and 25° C., in the presence of methacrylic anhydride as crosslinking monomer.

These aqueous dispersions, the water content of which is from 45 to 55% by weight, do not, however, afford pressure-sensitive adhesives which have the desired compromise of adhesion and cohesion properties. The state of the art can thus be summarized in the field of the pressure-sensitive acrylic adhesives obtained in emulsion form by the fact that, on account of the antagonistic effects exerted by long-chain acrylics on these two properties, it is difficult to obtain a good compromise between adhesion and cohesion in aqueous emulsion form.

The problem for the invention to solve thus consists in developing a pressure-sensitive adhesive which can be applied in particular to polyvinyl chloride, polyethylene, polypropylene, polyethylene terephthalate, paper, glass, etc. and which has both a cohesion which is sufficient to combat the effects of migration of the plasticizers, and an initial adhesion and tack which are sufficiently high, in order to retain an acceptable level of properties after ageing of the product. It is generally accepted that a product has correct accelerated ageing if the value of the adhesive properties, measured after the film has remained for 7 days in an oven at 60° C., remains equal to or greater than 60% of the values measured initially.

This problem is solved by the present invention in the context of a pressure-sensitive adhesive one-component system consisting of an aqueous dispersion of an acrylic ester copolymer obtained in the presence of a crosslinking monomer bearing a functional group, the said copolymer having a glass transition temperature which does not exceed 0° C., characterized in that the said crosslinking monomer is methacrylic anhydride.

The acrylic esters forming part of the composition of a copolymer as defined above are well known in the prior art. These are, on the one hand, acrylic and methacrylic esters, the homopolymer of which has a glass transition temperature not exceeding 10° C., such as acrylates having from 1 to 8 carbon atoms in the ester radical and methacrylates having at least 5 carbon atoms in the ester radical. These esters are usually denoted in the art as forming part of flexible monomers, in contrast with hard monomers (the homopolymer of which has a glass transition temperature at least equal to 20° C.), such as styrene, methacrylates having not more than 4 carbon atoms in the ester radical, and certain acrylates such as t-butyl acrylate, n-tetradecyl acrylate and n-hexadecyl acrylate.

As examples of acrylic esters forming part of the present invention, mention may be made in particular of methyl, ethyl, isopropyl, n-propyl, isobutyl, n-butyl, 2-ethylhexyl and n-octyl acrylates, as well as n-pentyl, n-hexyl, n-octyl, n-decyl, n-dodecyl, n-tetradecyl and n-isobornyl methacrylates. Preferably, the copolymer of the aqueous dispersion according to the invention comprises at least two flexible acrylic esters as defined above, and the proportions of which are such that the glass transition temperature of the copolymer does not exceed 0° C. Preferably, this set of at least two flexible acrylic esters comprises, on the one hand, a main monomer, i.e. one which is present in a proportion of at least 50% by weight of the set, and, on the other hand, one or more secondary monomers present in a proportion of less than 50% by weight of the set. According to a more particularly preferred embodiment of the present invention, the set of flexible acrylic esters comprises from 50 to 90% by weight of 2-ethylhexyl acrylate and the remainder to 100% of acrylate(s) and/or methacrylate(s), the homopolymer(s) of which has (have) one (or more) glass transition temperature(s) above that of poly(2-ethylhexyl acrylate) (−70° C.).

One of the essential features of the present invention consists of the fact that the acrylic copolymer whose Tg does not exceed 0° C. is modified by crosslinking with methacrylic anhydride. Depending on the commercial availabilities and the manufacturing constraints, the methacrylic anhydride used for the preparation of the modified acrylic copolymer in aqueous dispersion form is usually a product with a purity at least equal to 96% by weight, also comprising up to 3% by weight of methacrylic acid, as well as up to 0.2% by weight of at least one polymerization inhibitor (usually of phenolic type, such as butylhydroxytoluene) and the remainder to 100% of various impurities.

Another essential feature of the present invention lies in the fact that the crosslinking monomer affords advantageous technical effects on the properties of the pressure-sensitive adhesive already when its weight proportion of solid materials in the dispersion is very low. Indeed, methacrylic anhydride preferably represents between 0.4 and 2.5% approximately, and more particularly between 0.5% and 1.5%, by weight of solid materials in the dispersion. It is observed that proportions greater than 2.5% by weight provide no additional improvement in the properties of the adhesive and can lead to difficulties in synthesizing the emulsion on account of the well known tendency of methacrylic anhydride to precipitate in water, forming a gelatinous mass.

An additional improvement of the properties of the adhesive according to the invention can be obtained when the aqueous dispersion also comprises at least one chain-transfer agent. The choice of methacrylic anhydride as crosslinking monomer has the advantage of allowing the use of very common chain-transfer agents instead of the very specific water-soluble compounds of JP-A-2/003,404. These chain-transfer agents generally comprise at lest one group containing an active hydrogen, such as a hydroxyl or —SH group as chain-transfer group. As examples of chain-transfer agents which can be used in the aqueous dispersion according to the invention, mention may be made of thioglycolic acid, alkylthioacetic acid, mercaptans such as butyl mercaptan, n-dodecyl mercaptan and dodecylbenzyl mercaptan, as well as water-soluble saturated hydroxyaliphatic compounds. Among these compounds, mention may be made in particular, of saturated hydroxyalkyl aliphatic amines such as tetrahydroxyethylethylenediamine, and monohydric alcohols such as isopropanol, isobutanol, isoamyl alcohol, isohexanol and cyclohexanol. Preferably, the chain-transfer agent is present in the aqueous dispersion according to the invention in a proportion of between about 0.05 and 2% by weight of the solid materials, depending on the type of agent chosen. By way of example, a mercaptan will usually be chosen in a proportion of between 0.05 and 0.2% approximately by weight of solid materials, whereas a monohydric alcohol will rather be chosen in a proportion of between 1 and 2% approximately by weight of solid materials in the dispersion.

The unreacted chain-transfer agent can readily be detected by headspace-injection gas chromatography.

As is well known in the art, the aqueous dispersion according to the invention can also comprise at least one unsaturated carboxylic acid, in an amount preferably of between 0.5 and 5% by weight, more particularly between 2.5 and 5% by weight, of the solid materials in the dispersion. As examples, mention may be made of $\alpha,\beta$-ethylenically unsaturated acids such as acrylic acid, methacrylic acid, maleic acid and fumaric acid.

The synthesis of the aqueous dispersion according to the invention is carried out under standard emulsion polymerization conditions, using, as catalyst, a persulphate such as ammonium persulphate, potassium persulphate or sodium persulphate in a proportion of from 0.1 to 0.5% approximately of the total weight of the monomers and preferably using an activator chosen from sulphites, hydrogenosulphites and metabisulphites, with most particular preference for sodium metabisulphite. The catalytic system can also comprise an organic peroxide or hydroperoxide, or alternatively a redox system. The emulsion is obtained using surfactants which are, preferably, mixtures of at least one nonionic surfactant and at least one anionic surfactant. As anionic agents, mention may be made in particular of alkyl sulphates, alkyl sulphonates and alkylaryl sulphonates, as well as esters of sulphosuccinic acid with alkanols. An example more particularly preferred is sodium nonylphenol polyglycol ether sulphate. As nonionic agents, mention may be made in particular of nonylphenol ethoxylates comprising from 4 to about 100 ethylene oxide groups in the molecule.

The polymerization is generally carried out at a temperature of between 50 and 85° C. approximately, and preferably between 70 and 85° C. It can be carried out at normal pressure, but also at a pressure above atmospheric pressure or under a slight negative pressure, without this adversely affecting the reaction.

Depending on the subsequent uses, the aqueous dispersion constituting the pressure-sensitive adhesive according to the invention preferably comprises from 57 to 75% approximately by weight of acrylic copolymer and from 43 to 25% approximately by weight of water. It can also be characterized by the following, preferable, particular features:

a pH of between 3.5 and 5.0 approximately, an average particle size in the dispersion of between 270 and 500 nanometers (nm) approximately.

The pressure-sensitive adhesives according to the present invention have not only the desired compromise of satisfactory adhesion and cohesion properties, but also, and especially, entirely noteworthy remanence of these properties over time, including under severe temperature conditions. This remanence is reflected in particular by properties which, when measured after the film has stayed for 7 days in an oven at 60° C., remain at least equal to 60%, preferably at least 90%, of the values measured initially. The pressure-sensitive adhesives according to the present invention are also characterized by the transparency of their films and their absence of yellowing over time.

According to a second aspect, the present invention thus relates to a pressure-sensitive adhesive in the form of an aqueous dispersion having all of the following properties:

a shear strength, measured according to FINAT method No. 8, at least equal to 5000 minutes approximately, a contact aggressiveness, measured according to FINAT method No. 9, at least equal to 7 N/25 mm approximately, and an adhesion to glass at 180° after 20 minutes, according to the FINAT method No. 1, after 7 days of pasting at 60° C., at least equal to 8 N/25 mm approximately.

Preferably, such an adhesive consists of a copolymer mainly of (meth)acrylic monomers.

The pressure-sensitive adhesives according to the present invention can also comprise, for certain specific applications, one or more biocides such as, in particular, chloro and non-chloro isothiazolones, in particular 2-methyl-4-isothiazolin-3-one and 5-chloro-2-methyl-4-isothiazolin-3-one.

According to a third aspect, the present invention relates to self-adhesive films based, in particular, on plasticized polyvinyl chloride, polyethylene, polypropylene, polyethylene terephthalate or paper, etc. containing, on one of their faces, a pressure-sensitive adhesive layer as described above. Such films find various applications in fields such as labelling, decoration and lettering.

The examples which follow illustrate the invention. Except where otherwise mentioned, all the amounts are expressed on a weight basis.

EXAMPLE 1

The following ingredients are loaded, at room temperature and in the following order, into a vat equipped with a suitable stirrer:

| | |
|---|---|
| demineralized water | 481.6 parts |
| sodium carbonate | 2.8 parts |
| cyclohexanol | 21 parts |
| Sermul EA 146 | 100.1 parts |

Sermul EA 146 is an anionic emulsifier based on sodium nonylphenol polyglycol ether sold by the company Servo Delden B.V.

The stirring is continued in this vat until the solution obtained is of entirely uniform appearance, after which the monomers below are dispersed in this vat:

| | |
|---|---|
| 2-ethylhexyl acrylate | 980 parts |
| ethyl acrylate | 175 parts |
| methyl acrylate | 175 parts |
| methacrylic acid | 42 parts |
| acrylic acid | 14 parts |
| methacrylic anhydride | 14 parts |

Separately, 350 parts of water and 3.5 parts of a 10% solution of a nonionic emulsifier sold under the name Synperonic NP 40/70 are successively loaded into a jacketed reactor equipped with a condenser, a suitable stirrer and a thermocouple, after which the contents of the reactor are heated to 80° C. When this temperature is reached, 4.2 parts of ammonium persulphate are added and then, using a metering pump, over a period of 4 hours and while maintaining the temperature between 80 and 82° C., all of the pre-emulsion of monomers from the vat is added.

When the addition is complete, the reaction is left to continue for 1 hour, while maintaining the bulk temperature between 80 and 82° C. This temperature is then lowered to 60° C. and the following are then added:

10% iron(III) nitrate solution 3 drops

10% Luperox H solution 7 parts

5% Rongalit C solution 14 parts

The Luperox H70 solution is added over a period of about 15 minutes, whereas the Rongalit C solution is introduced over 30 minutes. Rongalit C is a sodium formaldehyde sulphoxylate sold by BASF A.G. Luperox H70 is an organic peroxide sold by Luperox GmbH.

After cooling to room temperature, the following are added:

| | |
|---|---|
| Biocide K10 | 2.4 parts |
| 5% Borchigel L75 solution | 11.9 parts |

The biocide K10 is a composition based on 2-methyl-4-isothiazolin-3-one sold by the company Progiven. Where appropriate, it can be replaced in equivalent amount by Acticide SPX, which is an aqueous 1.5% solution of a mixture of 5-chloro-2-methyl-4-isothiazolin-3-one and 2-methyl-4-isothiazolin-3-one, sold by the company Thor Chemicals (UK) Ltd. Borchigel L75 is a viscosity modifier which is recommended for thickening acrylic dispersions.

A lump-free latex is thus obtained, the physical characteristics of which are as follows:

| | |
|---|---|
| content of solid materials | 60% |
| Brookfield viscosity at 50 rpm | 150 mPa.s |
| pH | 4.3 |

The adhesive properties are evaluated in the following way:
the liquid product is coated onto a silicone paper so as to obtain a dry deposit of about 20 g/m². The wet film is transferred into a ventilated oven and dried for 3 minutes at a temperature of 110° C. The final complex is obtained by applying the film of adhesive to a film of plasticized polyvinyl chloride.

This complex then undergoes the following conditioning:
24 hours at 23° C. and 50% relative humidity,
7 days at 60° C.

The following adhesive characteristics are measured on this complex:
peel strength (adhesion to glass after 20 minutes and 24 hours of pasting)
contact aggressiveness ("looptack") on glass
shear strength For the product in dispersion form described above, the characteristics indicated in Table I below are obtained.

The characteristics of adhesion to glass at 180° after 20 minutes or 24 hours of pasting were measured according to the FINAT No. 1 test method (and expressed in N/25 mm) and the shear strength was measured according to FINAT method No. 8 and expressed in minutes. The contact aggressiveness ("looptack") was measured according to FINAT standard No. 9 and expressed in N/25 mm.

Example 2 (Comparative)

The procedure of Example 1 is repeated, except that the methacrylic anhydride is replaced with an equivalent weight-amount of a conventional crosslinking monomer, N-methylolacrylamide. The adhesion characteristics of the dispersion product thus obtained were measured under the same conditions as those of Example 1 and the results of these measurements are indicated in Table I below.

Example 3

The procedure of Example 1 is repeated, except that the cyclohexanol is replaced with an equivalent weight-amount of another transfer agent, isopropanol. The adhesion characteristics of the dispersion product thus obtained were measured under the same conditions as those of Example 1 and the results of these measurements are indicated in Table I below.

Example 4

The procedure of Example 3 is repeated, except that the amount of methacrylic anhydride is brought to 28 parts (i.e. 2% of the acrylic monomers). The adhesion characteristics of the dispersion product thus obtained were measured under the same conditions as in Example 1, and the results of these measurements are indicated in Table I below.

Example 5

The procedure of Example 1 is repeated, except that the cyclohexanol is replaced with 1.4 parts of n-dodecyl mercaptan. The adhesion characteristics of the dispersion product thus obtained were measured under the same conditions as those of Example 1, and the results of these measurements are indicated in Table I below.

Example 6

The procedure of Example 3 is repeated except that the 2-ethylhexyl acrylate is replaced by an equivalent weight-amount of butyl acrylate. The average particle size of the dispersion obtained is 425 nanometers. Its adhesion characteristics, measured under the same conditions as those of Example 1, are indicated in Table I below.

TABLE I

| Property | Example 1 | Example 2 | Example 3 | Example 4 | Example 5 | Example 6 |
|---|---|---|---|---|---|---|
| Adhesion at 20 min (23° C.) | 12.0 | 10.0 | 14.6 | 10.0 | 9.0 | 14.0 |
| Adhesion at 24 h (23° C.) | 10.0 | 17.2 | 19.3 | 18.0 | 18.0 | 15.0 |
| Adhesion at 20 min after 7 days at 60° C. | 12.5 | 1.9 | 9.3 | 10.0 | 11.0 | 17.0 |
| Shear | >10,000 | 4600 | >10,000 | >10,000 | >10,000 | >10,000 |
| Aggressiveness | 14.0 | 14.3 | 14.5 | 9.5 | 9.5 | 7.0 |
| pH | 4.5 | (1) | 4.3 | 4.3 | 4.5 | 4.6 |

(1) property not determined for this example.

The results collated in Table I show that, compared with Comparative Example 2, the present invention provides:
maintenance or improvement in the peel strength at room temperature,
very considerable improvement (multiplication by a factor at least equal to 5) of the peel strength under severe conditions (7 days at 60° C.), and
considerable improvement (multiplication by a factor at least equal to 2) of the shear strength.

Example 7

The procedure of Example 1 is repeated, except that the amount of demineralized water is decreased so as to adjust the content of solid materials to 65%, and except that the cyclohexanol is replaced with an equivalent weight-amount of another transfer agent, sec-butanol. The physicochemical characteristics (pH, average particle size) and adhesion characteristics of the product thus obtained, measured under the same conditions as in Example 1, are indicated in Table II below.

Example 8

The procedure of Example 7 is repeated, except that the sec-butanol is replaced with another transfer agent, thioglycolic acid, in a proportion of 0.05% by weight relative to the acrylic monomers. The characteristics of the product obtained are reported in Table II below.

Example 9

The procedure of Example 7 is repeated, except that the sec-butanol is replaced with another transfer agent, carbon tetrabromide, in a proportion of 0.1% by weight relative to the acrylic monomers. The characteristics of the product obtained are reported in Table II below.

Example 10

The procedure of Example 1 is repeated, except that the transfer agent is dispensed with and in that the proportion of methacrylic anhydride is reduced to one-half (to 0.5% of the acrylic monomers). The characteristics of the product obtained are reported in Table II below.

Example 11

The procedure of Example 8 is repeated except that the proportion of thioglycolic acid is doubled (to 0.1% of the acrylic monomers) and in that the 2-ethylhexyl acrylate is replaced with an equivalent amount of butyl acrylate. The characteristics of the product obtained are reported in Table II below.

Example 12 (Comparative)

The procedure of Example 1 is repeated, except that the methacrylic anhydride is totally omitted. The characteristics of the product obtained are reported in Table II below.

Example 13

The procedure of Example 1 is repeated, except that the proportion of methacrylic anhydride is doubled (to 2% of the acrylic monomers) and the acrylic acid and methacrylic acid are totally omitted. The characteristics of the product obtained are reported in Table II below.

TABLE II

| Property | Example 7 | Example 8 | Example 9 | Example 10 | Example 11 | Example 12 | Example 13 |
|---|---|---|---|---|---|---|---|
| Adhesion at 20 min (23° C.) | 10.0 | 10.0 | 12.0 | 7.0 | 12.0 | 14.5 | 10.0 |
| Adhesion at 24 h (23° C.) | 18.0 | 16.0 | 16.0 | 11.0 | 18.0 | 15.0 | 13.0 |
| Adhesion at 20 min after 7 days at 60° C. | 12.0 | 12.0 | 16.0 | 10.0 | 16.0 | 10.5 | 11.0 |
| Shear | >10,000 | >10,000 | >10,000 | 5000 | >10,000 | 700 | >10,000 |
| Aggressiveness | 12.0 | 11.0 | 12.0 | 9.0 | 10.0 | 13.5 | 11.0 |
| pH | 4.3 | 4.9 | 4.5 | 4.0 | 4.2 | 4.9 | 4.0 |
| DMP[(2)] | 310 | 350 | 313 | 320 | 440 | 310 | 350 |

[(2)]average particle size of the dispersion, expressed in nm.

The results collated in Table II show, when compared with Comparative Examples 2 and 12:
- a considerable improvement in the peel strength under severe conditions (7 days at 60° C.), even when the proportion of methacrylic anhydride is lowered to 0.5% by weight,
- a substantial improvement in the shear strength, at the cost, in the latter case, of a slight decrease in the peel strength at room temperature.

What is claimed is:

1. Pressure-sensitive adhesive comprising an aqueous dispersion of an acrylic ester copolymer obtained in the presence of a crosslinking monomer bearing a functional group, the copolymer having a glass transition temperature which does not exceed 0° C., wherein the crosslinking monomer is methacrylic anhydride, and is used in a quantity of from 0.4 to 2.5% by weight of the solid materials in the dispersion, and wherein the pressure-sensitive adhesive has all of the following properties:
   - a shear strength, measured according to FINAT method No. 8, at least equal to 5000 minutes,
   - a contact aggressiveness, measured according to FINAT method No. 9, at least equal to 7 N/25 mm, and
   - an adhesion to glass at 180° after 20 minutes, according to FINAT method No. 1, after 7 days of pasting at 60° C., at least equal to 8 N/25 mm.

2. Pressure-sensitive adhesive according to claim 1, wherein the acrylic esters forming part of the composition of the copolymer are acrylic and methacrylic esters, the homopolymer of which has a glass transition temperature not exceeding 10° C.

3. Pressure-sensitive adhesive according to claim 1, wherein the esters are selected from acrylates having from 1 to 8 carbon atoms in the ester radical and methacrylates having at least 5 carbon atoms in the ester radical.

4. Pressure-sensitive adhesive according to claim 1, which also comprises at least one chain-transfer agent.

5. Pressure-sensitive adhesive according to claim 4, wherein the chain-transfer agent is selected from thioglycolic acid, alkylthioacetic acid, mercaptans, water-soluble saturated hydroxyaliphatic compounds, hydroxyalkyl aliphatic amines, monohydric alcohols and carbon tetrabromide.

6. Pressure-sensitive adhesive according to claim 5, wherein the chain-transfer agent is present in a proportion of between 0.05 and 2% by weight of the solid materials.

7. Pressure-sensitive adhesive according to claim 1, which also comprises at least one unsaturated carboxylic acid in an amount of between 0.5 and 5% by weight of the solid materials.

8. Pressure-sensitive adhesive according to claim 1, wherein the aqueous dispersion comprises from 57 to 75% by weight of acrylic copolymer and from 43 to 25% by weight of water.

9. Pressure-sensitive adhesive according to claim 1, wherein the pH of the aqueous dispersion is between 3.5 and 5.0.

10. Pressure-sensitive adhesive according to claim 1, wherein the average particle size of the dispersion is between 270 and 500 nanometers.

11. Pressure-sensitive adhesive film containing, on one of its faces, a layer of a pressure-sensitive adhesive in accordance with claim 1.

* * * * *